UNITED STATES PATENT OFFICE.

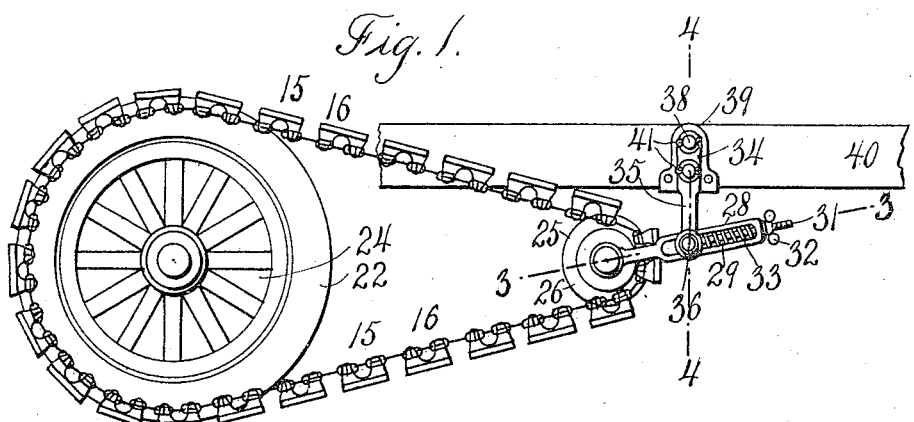
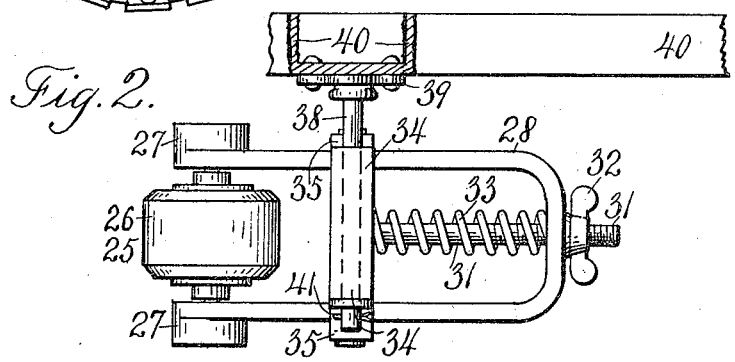
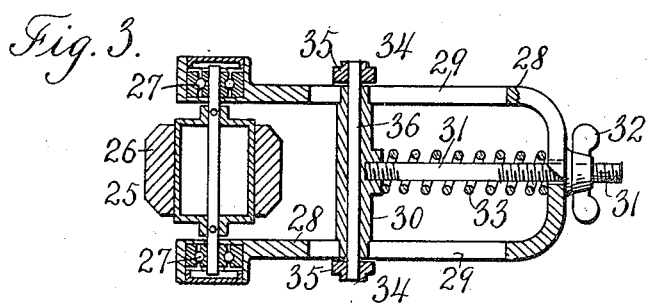
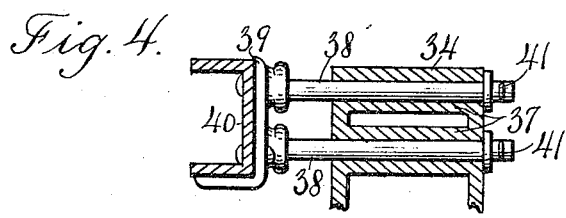

ANDREW J. BORST, JR., OF BUFFALO, NEW YORK.

NON-SKIDDING TRACTION DEVICE.

1,276,319.  Specification of Letters Patent.  Patented Aug. 20, 1918.

Application filed November 23, 1916.  Serial No. 132,988.

*To all whom it may concern:*

Be it known that I, ANDREW J. BORST, Jr., a citizen of the United States of America, and a resident of th city of Buffalo, county of Erie, and State of New York, have invented certain new and useful Improvements in Non-Skidding Traction Devices, of which the following is a full, clear, and exact description.

My invention relates generally to a path-preparing, non-skidding, tire protecting, traction device and more particularly to a device for use on heavy automobile trucks and other self-propelled vehicles.

The general object of my invention has been to provide a device which shall not only prevent skidding and protect the tires of the rear wheels of a truck, but also one which shall act as a tractor and lay such a path over obstacles before the drive wheel around which it passes as to do away with the undesirable bumping caused by the ordinary tire chains.

Another object has been to provide a device which shall permit the leading member to automatically aline itself and the tractor member with the vehicle wheel.

My device is made flexible, or yieldable and self adjustable, so as to pass over any obstacle in the road, gradually raising the wheel to the level of and over the obstacle without the usual shock of the impact, and provides a non-skidding attachment which may be easily applied to or removed from the wheel without the use of hooks or holdfast devices.

Reference is to be had to the accompanying drawings, in which like characters of reference indicate like parts in the several views, of which:

Figure 1 is a side elevation of my complete device attached to the wheel and chassis of a motor driven vehicle.

Fig. 2 is an enlarged plan, view of a portion of the device, shown in Fig. 1.

Fig. 3 is an enlarged, sectional view of the adjustable idler and tension means and is taken on line 3—3 of Fig. 1.

Fig. 4 is a fragmentary, sectional elevation taken on line 4—4 of Fig. 1, showing the means of connecting the idler to the frame of the vehicle whereby automatic alining is obtained.

The tractor member of my device comprises two endless chains 15 to which are attached tractor blocks 16.

The face of each tractor block is preferably formed with a plurality of ridges of any suitable design so as to provide an anti-skid surface. Treads of rubber may be used instead of, or with, the ridges.

Arranged in front of the wheel 24, and substantially in the same plane therewith that it may normally oscillate and support the tractor member well above the surface traveled, being drawn down automatically by the pull of the tractor member as the condition of the surface traveled affects it, is an idler 25. This idler may be of any suitable construction but it is preferably formed as shown and provided with a rubber periphery 26 of the same shape as the shape of the tires on the wheel 24. This idler is preferably mounted in anti-friction bearings 27, which are carried at the outer ends of a horizontally pivoted yoke 28 of an idler supporting element secured to the frame of the vehicle at a distance forward of the vehicle wheel. This yoke is provided on each side with a longitudinal slot 29, in which a crosshead 30 is slidably arranged. The ends of the crosshead, which engage with the yoke, are reduced and flattened so as to prevent the same from rotating or displacement. 31 is an adjusting rod, having its inner end secured to the crosshead 30 and its outer end passing through the aperture formed in the yoke 28. The outer end of the rod 31 is screw-threaded for a considerable distance and mounted thereon is a thumb nut 32, by which the crosshead 30 may be moved toward and from the outer end of the yoke. A helical spring 33 is disposed about the rod 31 and has its ends bearing against the crosshead and the yoke. This spring keeps the idler flexibly drawn toward the crosshead, thus keeping the chains of the device taut. When it is desired to release the tension on the chains to effect their removal or repair, the thumb nut 32 is operated to compress the spring, thereby moving the idler away from the crosshead and slacking the chain.

34 is a laterally movable yoke supporting member of the idler supporting element having downwardly extending arms 35 embracing the yoke 28. A pin 36, passing through the lower extremities of the arms 35, confines them between the crosshead 30 of the yoke. The upper end of the U-shaped member 35 is preferably provided with two lateral bosses 37, each of which is provided with an aperture for engagement with the rods 38. These rods extend outwardly and are carried by a member 39, as seen in Fig. 6, secured to the frame 40 of the vehicle. Cotter pins 41 are preferably passed through the rods 38, thus securely holding the U-shaped member 34 on the rods 38 but permitting side play for the necessary adjustment and alinement with the vehicle wheel. Continued experiment indicates to me that in addition to yielding forward and backward movement, the idler must have some up and down movement and preferably also lateral movement in order, when obstacles are encountered in a position off the center line of the tractor member, that wrenching strains which tend to snap small parts may be compensated for.

Should it be desired to remove a tire from the wheel to which my device is applied, it is only necessary to operate the thumb nut so as to force the idler away from the crosshead 30, whereupon the chain will be slackened and it may then be easily removed from the tire.

Obviously, some modifications of the details herein shown and described may be made without departing from the spirit of my invention or the scope of the appended claims, and I do not, therefore, wish to be limited to the exact embodiment herein shown and described.

Having thus described my invention, what I claim is:

1. The combination, with a wheel of a self-propelled vehicle, of a traction device, comprising an idler supporting element mounted on a substantially fixedly-located part of the vehicle forward of the wheel, an idler yieldingly and pivotally mounted in the supporting element so as to yield toward and from the wheel and oscillate vertically at a substantial distance above the surface traveled, and a tractor member passing around the wheel and idler.

2. The combination, with a wheel of a self-propelled vehicle, of a traction device, comprising an idler supporting element mounted on a substantially fixedly-located part of the vehicle forward of the wheel, an idler mounted in a both vertically and longitudinally yieldable bearing on the supporting element at a substantial height above the surface traveled, and a tractor member passing around the wheel and idler.

3. The combination, with a wheel of a self-propelled vehicle, of a traction device, comprising an idler supporting element mounted on a substantially fixedly-located part of the vehicle forward of the wheel, an idler mounted in a horizontally pivoted longitudinally yieldable yoke on the idler supporting element at a substantial height above the surface traveled, and a tractor member passing around the wheel and idler.

4. The combination, with a wheel of a self-propelled vehicle, of a traction device, comprising an idler mounted in a longitudinally yieldable, vertically and laterally movable idler supporting element forward of the wheel at a substantial height above the surface traveled, and a tractor member passing around the wheel and idler.

5. The combination, with a wheel of a self-propelled vehicle, of a traction device, comprising an idler mounted so as to yield toward and from the wheel, oscillate vertically with respect to the surface traveled and laterally movable into and out of alinement with the wheel, and a tractor member passing around the wheel and idler.

6. The combination, with a wheel of a self-propelled vehicle, of a traction device, comprising an idler supporting element mounted on a substantially fixedly-located part of the vehicle forward of the wheel, a vertically and longitudinally yieldable self-alining idler mounted in said idler supporting element, and a tractor member passing around the wheel and idler.

7. The combination, with a wheel of a self-propelled vehicle, of a traction device, comprising a vertically and longitudinally yieldable idler, an idler supporting element mounted on the vehicle in a substantially fixed location forward of the wheel and adapted to permit automatic adjustment of the idler with respect to the line of travel of the wheel, and a tractor member passing around the wheel and idler.

8. The combination, with a wheel of a self-propelled vehicle, of a traction device, comprising an idler, a supporting element for the idler, mounted on a vehicle part in a substantially fixed location forward of the wheel and including a yieldable, horizontally pivoted yoke, and a yoke supporting member adapted to permit automatic adjustment of the idler with respect to the line of travel of the wheel, and a tractor member passing around the wheel and idler.

9. The combination, with a wheel of a self-propelled vehicle, of a path-preparing, traction device, comprising an idler supporting element mounted on a vehicle part in a substantially fixed location forward of the wheel, a vertically and longitudinally yieldable self-alining idler mounted in the idler supporting element and a path-preparing tractor member passing around the wheel and idler.

10. The combination, with a wheel of a self-propelled vehicle, of a non-skidding, traction device, comprising a U-shaped yoke supporting member, a yoke provided with slotted arms, a crosshead carried by the U-shaped yoke-supporting member and disposed within and between the slotted arms, tension means between the crosshead and the yoke, an idler rotatably carried by the yoke, and a tractor member passing around the wheel and idler.

In testimony whereof, I have hereunto signed my name.

ANDREW J. BORST, Jr.